United States Patent
Omi

(10) Patent No.: US 8,009,051 B2
(45) Date of Patent: Aug. 30, 2011

(54) SLEEP WARNING APPARATUS

(75) Inventor: Takuhiro Omi, Anjo (JP)

(73) Assignee: DENSO CORPORATION, Kariya (JP)

( * ) Notice: Subject to any disclaimer, the term of this patent is extended or adjusted under 35 U.S.C. 154(b) by 408 days.

(21) Appl. No.: 12/068,764

(22) Filed: Feb. 12, 2008

(65) Prior Publication Data
US 2008/0204256 A1 Aug. 28, 2008

(30) Foreign Application Priority Data
Feb. 26, 2007 (JP) ................................ 2007-045910

(51) Int. Cl.
G08B 23/00 (2006.01)

(52) U.S. Cl. ........................................ 340/575; 340/576

(58) Field of Classification Search .................. 340/575, 340/576, 573.1, 693.9; 455/404.1, 403; 180/272
See application file for complete search history.

(56) References Cited

U.S. PATENT DOCUMENTS

| | | | |
|---|---|---|---|
| 5,574,641 A | | 11/1996 | Kawakami et al. |
| 5,595,488 A | * | 1/1997 | Gozlan et al. ................. 434/236 |
| 5,689,241 A | * | 11/1997 | Clarke et al. ................... 340/575 |
| 6,070,098 A | * | 5/2000 | Moore-Ede et al. ........... 600/544 |
| 6,087,941 A | * | 7/2000 | Ferraz ............................ 340/575 |
| 6,265,978 B1 | * | 7/2001 | Atlas ............................. 340/575 |
| 6,353,396 B1 | * | 3/2002 | Atlas .......................... 340/693.9 |
| 6,859,143 B2 | * | 2/2005 | Braeuchle et al. ............. 340/576 |
| 7,027,621 B1 | * | 4/2006 | Prokoski ....................... 382/118 |
| 7,202,792 B2 | * | 4/2007 | Zhang et al. ................... 340/575 |
| 7,423,540 B2 | * | 9/2008 | Kisacanin ..................... 340/576 |
| 7,692,548 B2 | * | 4/2010 | Bonefas et al. ................ 340/575 |
| 7,692,549 B2 | * | 4/2010 | Bonefas et al. ................ 340/575 |
| 2002/0015527 A1 | * | 2/2002 | Nambu .......................... 382/218 |
| 2003/0011481 A1 | * | 1/2003 | Bjorkman ...................... 340/576 |
| 2004/0209594 A1 | * | 10/2004 | Naboulsi ..................... 455/404.1 |
| 2004/0260440 A1 | * | 12/2004 | Fujita et al. ...................... 701/36 |
| 2008/0136609 A1 | * | 6/2008 | Nakatani et al. ............ 340/425.5 |
| 2008/0204256 A1 | * | 8/2008 | Omi ............................... 340/575 |

(Continued)

FOREIGN PATENT DOCUMENTS

CN 2222516 Y 3/1996

(Continued)

OTHER PUBLICATIONS

Kruip, Stefan, *Falling asleep alarm in the motor vehicle*, Erfinderaktivitäten 2004/2005, pp. 83-87, 2005 (machine translation enclosed).

(Continued)

Primary Examiner — Van T. Trieu
(74) Attorney, Agent, or Firm — Posz Law Group, PLC

(57) ABSTRACT

A sleep warning apparatus includes a stimulation generating portion, a reaction detecting portion, a warning determining portion, and a warning generating portion. The stimulation generating portion generates stimulation to a person before a warning is given to the person. The stimulation is used to take reaction of the person. The reaction detecting portion detects the reaction of the person to the stimulation when the stimulation generated by the stimulation generating portion is given to the person. The warning determining portion determines whether or not the warning is required to be given to the person depending on whether or not the reaction detecting portion detects the reaction of the person to the stimulation. The warning generating portion gives the warning to the person when the warning determining portion determines that the warning is required to be given to the person.

13 Claims, 4 Drawing Sheets

U.S. PATENT DOCUMENTS

2009/0018419 A1* 1/2009 Torch ........................... 600/318

FOREIGN PATENT DOCUMENTS

| | | | |
|---|---|---|---|
| DE | 197 34 307 | | 2/1999 |
| DE | 102 23 210 | | 12/2003 |
| DE | 10223210 A1 | * | 12/2003 |
| DE | 103 38 945 | | 3/2005 |
| JP | 56002227 A | * | 1/1981 |
| JP | A-56-002227 | | 1/1981 |
| JP | A-05-003921 | | 1/1993 |
| JP | 05023396 A | * | 2/1993 |
| JP | A-05-023396 | | 2/1993 |
| JP | A-06-233306 | | 8/1994 |
| JP | A-10-151959 | | 6/1998 |
| JP | A-11-122197 | | 4/1999 |
| JP | A-11-189066 | | 7/1999 |
| JP | A-2001-018717 | | 1/2001 |
| JP | A-2001-194161 | | 7/2001 |
| WO | WO 97/46158 | | 12/1997 |
| WO | WO 9746158 A1 | * | 12/1997 |

OTHER PUBLICATIONS

Office Action dated Apr. 24, 2008 in corresponding German Patent Application No. 10 2008 010 515.5 (and English translation).

Office Action dated Apr. 13, 2010 from China Patent Office in corresponding Chinese Patent Application No. 2008 1008 1326.6 (and English translation).

Office Action dated Sep. 25, 2009 in corresponding Chinese Patent Application No. 2008 1008 13266 (and English translation).

* cited by examiner

US 8,009,051 B2

SLEEP WARNING APPARATUS

CROSS REFERENCE TO RELATED APPLICATION

This application is based on and incorporates herein by reference Japanese Patent Application No. 2007-45910 filed on Feb. 26, 2007.

BACKGROUND OF THE INVENTION

1. Field of the Invention

The present invention relates to a sleep warning apparatus.

2. Description of Related Art

Conventionally, for example, JP-A-S56-2227, JP-A-H6-197888 (corresponding to U.S. Pat. No. 5,574,641), and JP-A-H11-189066 describes a falling-asleep-at-the-wheel warning apparatus for preventing a driver from falling asleep at the wheel. The falling-asleep-at-the-wheel warning apparatus described in JP-A-S56-2227 generates a pre-warning when a monotonous drive is detected. If the driver performs an operation of pressing a reset switch in response to the pre-warning, a warning (main warning) is not generated. However, if the above response operation is not performed, the main warning is generated.

The sleepiness of the driver depends on an individual difference, a body condition, and a psychological state, and therefore, the estimation result of the sleepiness does not always match with subjectivity of the driver. As a result, in a case, where the warning is generated based on the above estimation result, the warning may be generated when the sleepiness progresses to a certain extent to a certain driver, and thereby timing for providing the warning may be too late. In other case, the warning may be annoying the driver when the warning is given to the driver while the driver is aware. Therefore, as described in JP-A-S56-2227, the pre-warning is generated before the main warning is generated such that the main warning is not generated if the driver performs the response operation to the pre-warning. As a result, an unnecessary main warning is limited from being generated.

However, because the pre-warning may be generated while the driver is awake similarly to the main warning, a pre-warning that is not annoying to the driver is needed. Also, in the above JP-A-S56-2227, because the response operation needs to be performed every time the monotonous drive is detected, the driver may feel troublesome in performing the response operation.

SUMMARY OF THE INVENTION

The present invention is made in view of the above disadvantages. Thus, it is an objective of the present invention to address at least one of the above disadvantages.

To achieve the objective of the present invention, there is provided a sleep warning apparatus, which includes stimulation generating means, reaction detecting means, warning determining means, and warning generating means. The stimulation generating means generates stimulation to a person before a warning is given to the person. Here, the stimulation is used to take reaction of the person. The reaction detecting means detects the reaction of the person to the stimulation when the stimulation generated by the stimulation generating means is given to the person. The warning determining means determines whether or not the warning is required to be given to the person depending on whether or not the reaction detecting means detects the reaction of the person to the stimulation. The warning generating means gives the warning to the person when the warning determining means determines that the warning is required to be given to the person.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF PREFERRED EMBODIMENTS

Embodiment

Figure 1:
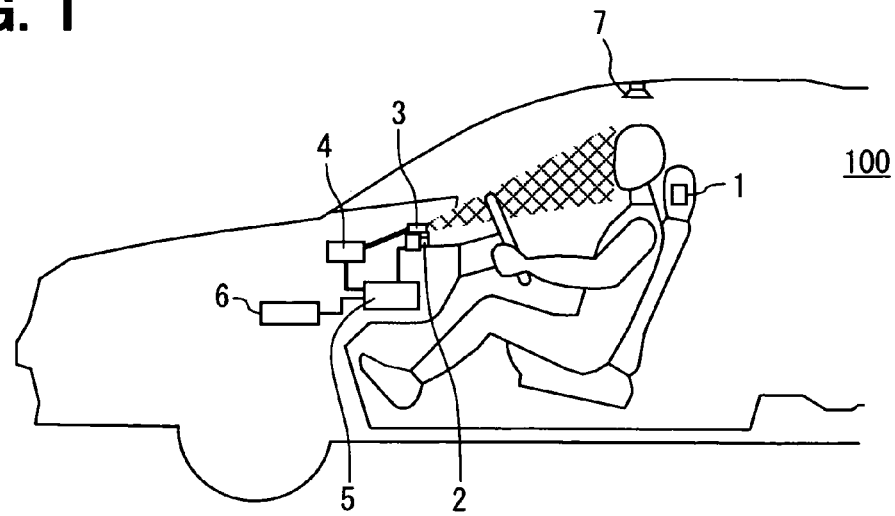
FIG. 1 is a diagram showing a general configuration of a sleep warning apparatus mounted on a vehicle.
Figure 2:
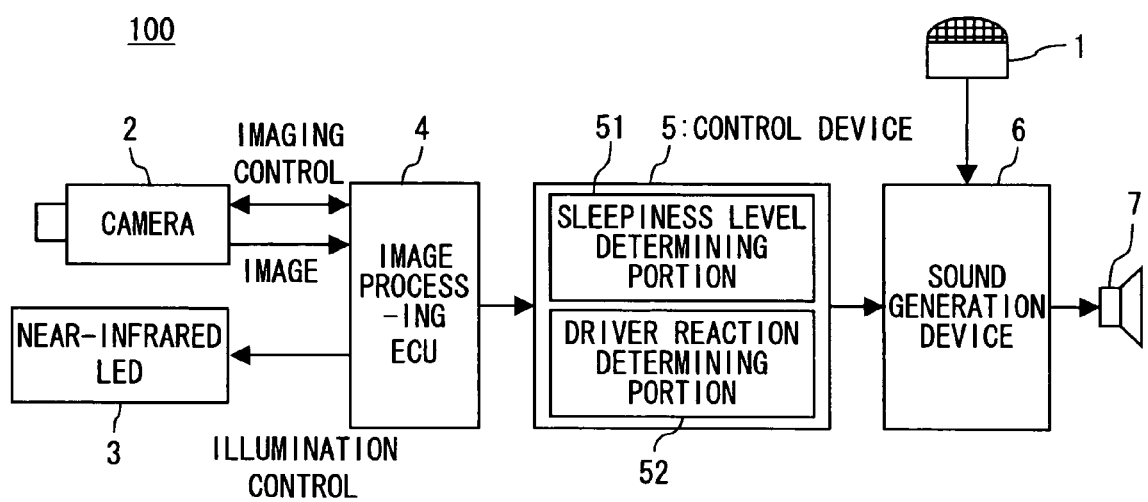
FIG. 2 is a block diagram of the sleep warning apparatus.

An embodiment of a sleep warning apparatus of the present invention is described with reference to accompanying drawings. FIG. 1 shows a general configuration of a sleep warning apparatus 100 mounted on a vehicle, and FIG. 2 shows a block diagram of the sleep warning apparatus 100. As shown in FIG. 1 and FIG. 2, the sleep warning apparatus 100 includes a microphone 1, a camera 2, a near-infrared LED 3 (LED 3), an image-processing/imaging-controlling circuit 4 (image processing ECU 4), a control device 5, a sound generation device 6, and a speaker 7.

The speaker 7 is provided in an appropriate position in a vehicle cabin of the vehicle for outputting a sound wave upon receiving a control signal from the sound generation device 6. The camera 2 is provided near an instrument panel of the vehicle for having an imaging range for capturing an image of a person (driver), who drives the vehicle, above a chest of the driver. The camera 2 repeatedly captures images of the driver within the imaging range irradiated by the LED 3 that emits light including near infrared light (e.g., a frame rate is about 30 to 60 [fps]).

Typically, the image processing ECU 4 executes an imaging control of the camera 2 and an illumination control of the LED 3, and also inputs image data captured by the camera 2 to temporarily store the data in a memory (not shown). For example, the image processing ECU 4 reads the image data captured by the camera 2 and sequentially executes a certain image recognition process such that the image processing ECU 4 generates processed data used for determining behavior or appearance of the driver to store the data in the memory.

The control device 5 includes a sleepiness level determination portion 51 and a driver reaction determination portion 52. The sleepiness level determination portion 51 determines (estimates) a sleepiness level, which changes with an intensity (e.g., strength level) of a sleepiness of the driver, based on a process result taken from the image processing ECU 4. Typically, the sleepiness can be indicated as a sleepiness level defined by about six steps, for example. For example, the sleepiness level becomes lower as the sleepiness becomes weaker (i.e., as the driver feels less asleep), and the sleepiness level becomes higher as the sleepiness becomes stronger (i.e., as the driver feels more asleep). Specifically, the sleepiness can be estimated in accordance with a change in a degree of opening of an eyelid of the driver, or with a change of a blink of the driver.

Figure 3:
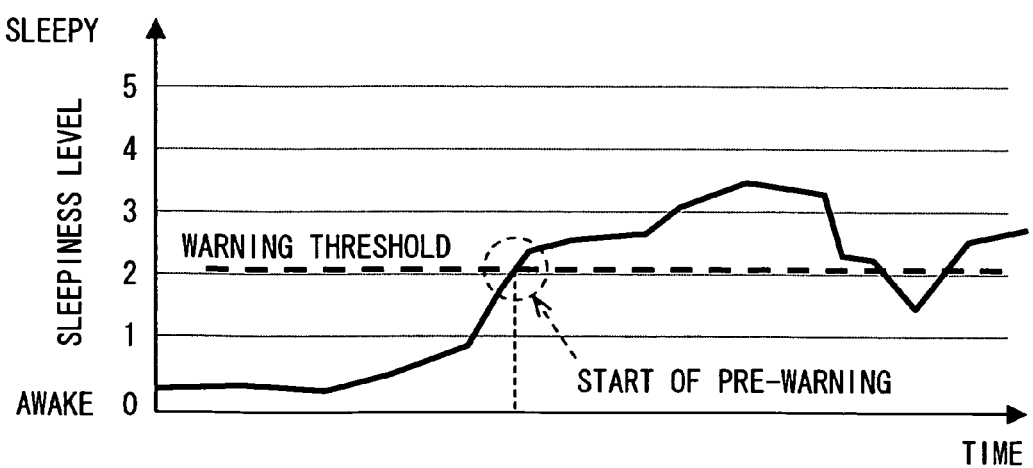
FIG. 3 is a diagram for explaining a sleepiness level and a warning threshold value.

The sleepiness level determination portion 51 has a warning threshold value that is set to define generation timing for generating stimulation (pre-warning) in response to the sleepiness level as shown in FIG. 3 in order to take reaction of the driver. The control device 5 generates the pre-warning when the sleepiness level of the driver exceeds the warning threshold value. In this way, when the driver is assumed to feel sleepiness, the pre-warning for taking the reaction of the driver can be generated.

The driver reaction determination portion 52 takes the processed data from the image processing ECU 4 to detect the reaction of the driver to the pre-warning based on the processed data, when the pre-warning is generated through the speaker 7. The driver reaction determination portion 52 detects the reaction of the driver in accordance with the behavior or the appearance of the driver. In the present embodiment, when the driver changes a facial expression, or when the driver changes a direction of its face or a sight line to face or lead toward the speaker 7, it is determined that the driver reaction determination portion 52 detects the reaction of the driver to the pre-warning. In other words, the driver reaction determination portion 52 detects a certain movement of the sight line of the driver as the reaction of the driver to the pre-warning.

Further, for example, the driver makes a predetermined gesture (for example, the driver repeatedly blinks twice, the driver turns its head rightward and leftward, or the driver opens its mouth), it may be alternatively determined that the driver reaction determination portion 52 detects the reaction of the driver. Due to the above, the driver is not always required to perform the response operation to the pre-warning, and still the reaction of the driver to the pre-warning can be detected based on the behavior or the appearance of the driver. Note that, the reaction of the driver to the pre-warning may be alternatively detected based on a biosignal (e.g., a change of a heart rate, a pulse, or a myogenic potential). Also, the driver reaction determination portion 52 determines that a warning (main warning) needs to be given to the driver when it is determined that the driver reaction determination portion 52 does not detect the reaction of the driver to the pre-warning. Thus, the driver reaction determination portion 52 outputs a signal indicating the above need to the sound generation device 6.

Figure 5:
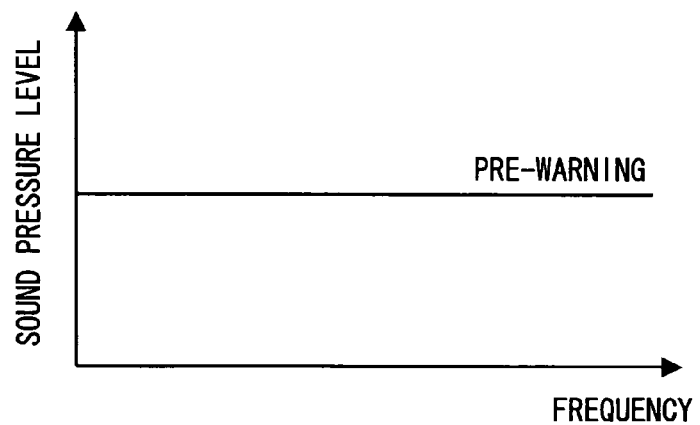
FIG. 5 is a diagram showing frequency characteristic of a white noise as the pre-warning.

The sound generation device 6 generates the pre-warning through the speaker 7 at a time when the sleepiness level of the driver exceeds the warning threshold value. Typically, the sound generation device 6 generates a white noise to output though the speaker 7. For example, the white noise has frequency characteristic that is generally uniform in an audio frequency band (about 20 to 20000 Hz) audible to a person, as shown in FIG. 5. In other words, the white noise does not have a peak at any specific frequency.

In the experiments by the inventor, when the white noise having the sound pressure level of about 70 [dB] is given to the driver, the driver acutely reacts to the white noise while the driver is awake. Also in the above case, the driver provides a subjective evaluation that indicates the white noise is not annoying. Typically, because the white noise has the above frequency characteristic, even when the white noise is given to the driver in addition to an environment sound (surrounding stimulation), the perceptive performance (sensing performance) of the driver to the surroundings is limited from deteriorating greatly. Therefore, in the present embodiment, the white noise is employed. Typically, the driver (person) receives the environment sound that comes from the surrounding environment of the driver.

The white noise generated by the sound generation device 6 has a sound pressure level (intensity) that is adjusted based on a sound pressure level of the environment sound. In other words, when the driver is awake, the driver is sensitive to (can acutely react to) a change (change rate) of the environment sound received from the surrounding environment, such as an increase and decrease of the environment sound. Thus, firstly, the microphone 1 takes the stimulation (environment sound) that is given to the driver from the surrounding environment. In a case, where the white noise is superimposed on the environment sound, the sound pressure level of the superimposed white noise is adjusted based on the sound pressure level of the environment sound such that the sound pressure level of the superimposed white noise becomes constant.

Figure 4:
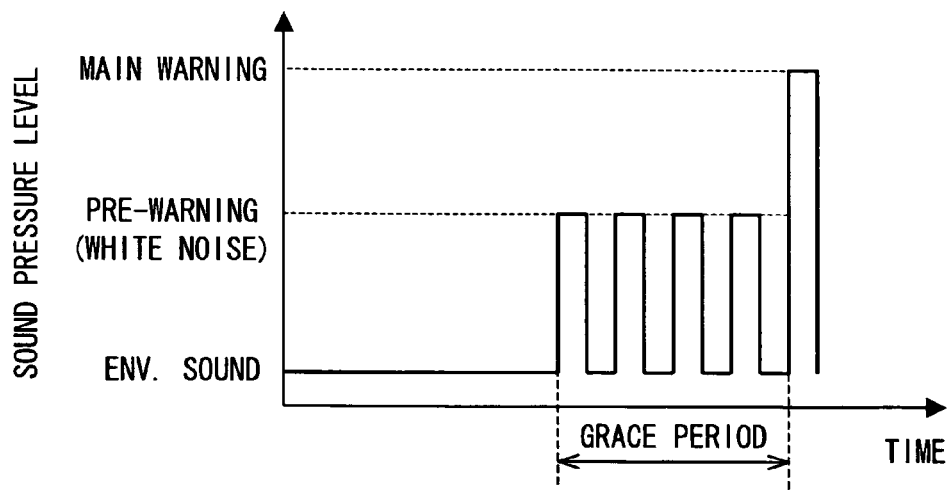
FIG. 4 is a diagram for explaining a pre-warning and a main warning.
Figure 7:
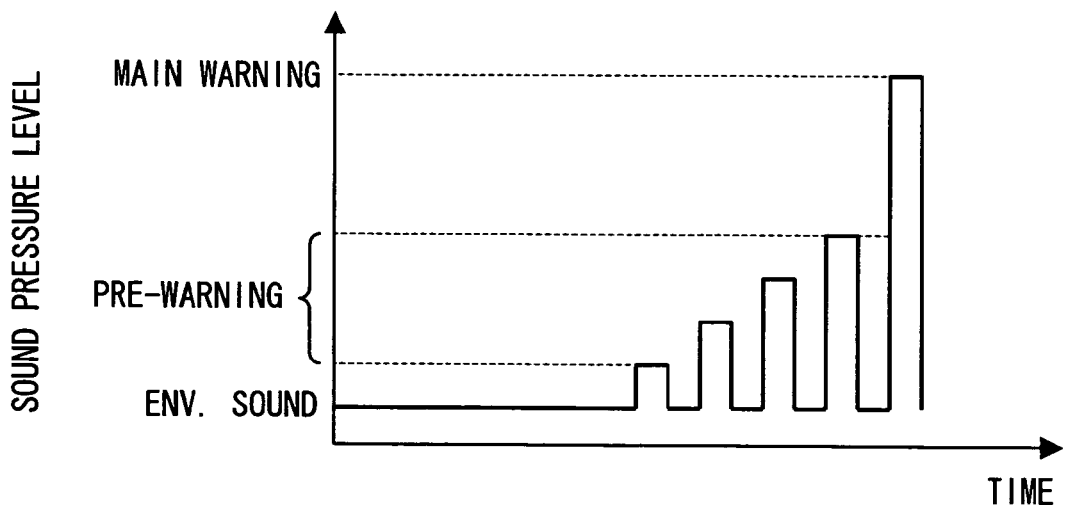
FIG. 7 is a diagram showing an example, in which a sound pressure level of the pre-warning is stepwisely increased.

Also, as above, when the driver is awake, the driver acutely reacts to the change (change rate) of the environment sound given to the driver from the surrounding environment. As a result, the white noise may be effectively generated if the sound pressure level of the white noise is intermittently increased or decreased relative to the sound pressure level of the environment sound as shown in FIG. 4. Alternatively, the white noise may be effectively generated if the sound pressure level of the white noise is gradually increased as time elapses relative to the sound pressure level of the environment sound as shown in FIG. 7.

Figure 6:
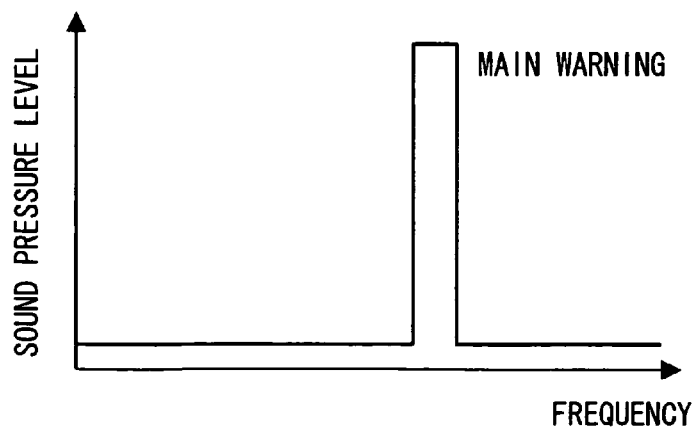
FIG. 6 is a diagram showing frequency characteristic of the main warning.

After the pre-warning is generated to be superimposed on the environment sound, if the reaction of the driver is not detected during a grace period (certain period), the sound generation device 6 receives a signal, which indicates the need of the warning, from the driver reaction determination portion 52. Then, the sound generation device 6 generates the main warning through the speaker 7 upon receiving the signal as shown in FIG. 4. The main warning has frequency characteristic that has a peak at a specific frequency as shown in FIG. 6. In contrast, if the reaction of the driver is detected during the grace period, the main warning is not generated.

Figure 8:
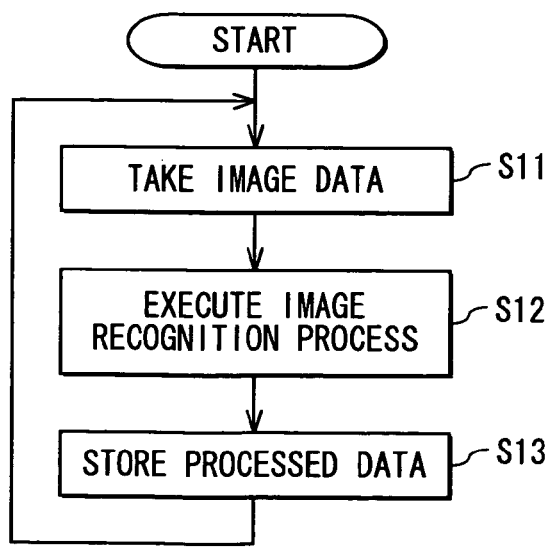
FIG. 8 is a flow chart of an image recognition process.
Figure 9:
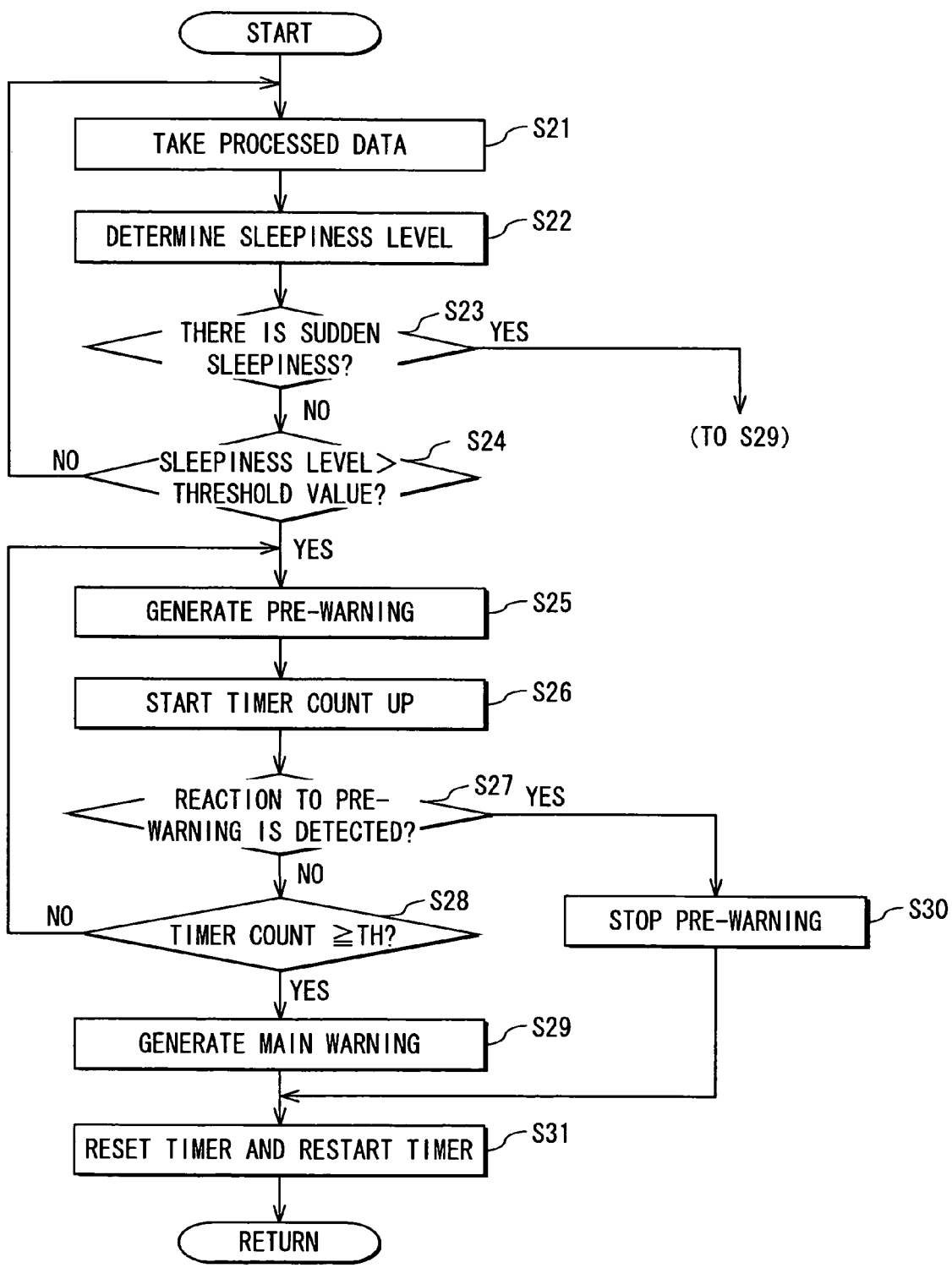
FIG. 9 is a flow chart of a sleep warning process.

Next, an operation of the sleep warning apparatus 100 is described using flow charts shown in FIG. 8 and FIG. 9. Note that although the driver falls asleep gradually (named as average sleepiness) in general, the driver may suddenly fall asleep (named as sudden sleepiness) in some cases. Therefore, the sleep warning apparatus 100 repeatedly executes a certain process prepared for the sudden sleepiness and another certain process prepared for the average sleepiness simultaneously such that the sleep warning apparatus 100 can deal with both the average sleepiness and the sudden sleepiness.

FIG. 8 is the flow chart of an image recognition process, which is repeatedly executed. At step S11 shown in FIG. 8, the image data is taken, and at step S12, the image recognition process is executed. At step S13, the processed data is stored in the memory.

FIG. 9 is the flow chart for a sleep warning process. At step S21 shown in FIG. 9, the processed data stored in the memory is taken, and the sleepiness level is determined (estimated) at step S22. In the determination of the sleepiness level, an moving average of the sleepiness level during a past period between last 10 seconds and last 60 seconds is computed as the sleepiness level by using stored processed data sets during the past period. Alternatively, the past period may be the other period different from the above (e.g., a period between last 30 seconds and last 60 seconds) as long as the moving average can be appropriately computed. In this way, the sleepiness level is determined based on the average (potential) sleepiness level always computed based on refreshed (new) data sets.

At step S23, it is determined whether or not there is the sudden sleepiness. In the sudden sleepiness, the sleepiness level is suddenly (sharply) increased. Therefore, the degree of the change of the sleepiness level is used to determine whether there is the sudden sleepiness. When the determination result at step S23 is "YES", the main warning is generated at step S29. In contrast, when the determination result at step S23 is "NO", control proceeds to step S24. At step S24, it is determined whether or not the sleepiness level exceeds the warning threshold value. When the determination result at step S24 is "YES", control proceeds to step S25. However, when the determination result at step S24 is "NO", control returns to step S21 to repeat the above process.

At step S25, the white noise as the pre-warning (white noise) is generated, and at step S26, a timer (not shown) of the control device 5 is started to count (e.g., timer count is started to be increased). At step S27, it is determined whether or not the reaction of the driver to the pre-warning is detected, and when it is determined that the reaction of the driver is not detected, control proceeds to step S28. In contrast, when it is determined that the reaction of the driver is detected, the pre-warning is stopped at step S30. Then, control proceeds to step S31.

At step S28, it is determined whether the timer has counted larger than or equal to a grace period TH shown in FIG. 3. Here, when the determination result is "YES", it is assumed that the reaction of the driver has not been detected (i.e., there has been no reaction) even when the grace period has elapsed since the start of the white noise generation. Thus, the main warning is generated at step S29. In contrast, when the determination result is "NO", control returns to step S25 to repeat the above process. At step S31, the count of the timer is reset, and then the timer is restarted to repeat the above process.

As above, the sleep warning apparatus 100 of the present embodiment gives the white noise, which the driver can react to if the driver is awake, to the driver before the main warning is generated. When the sleep warning apparatus 100 detects the reaction of the driver to the white noise during the grace period, the main warning is postponed. In this way, the awaken state of the driver (person) can be fed back to the operation of the warning. As a result, the driver is limited from performing the response operation to the white noise (e.g., the driver does not have to perform a dedicated operation to respond to the white noise, such as pressing a cancel button). Also, because the white noise for taking the reaction of the driver is given to the driver, the driver is limited from feeling annoyed. When the reaction of the driver to the white noise is detected, it is determined that the warning is not required to be given, and therefore postponing the generation of the warning. Thus, the driver is limited from receiving the annoying warning. Typically, the driver can acutely react to stimulation (white noise) unconsciously provided that the driver is awake.

The embodiment of the present invention has been described as above. However, the present invention is not limited to the above embodiment, and can be modified in various manners provided that the modification does not deviate from a gist of the present invention.

(First Modification)

In the above embodiment, the white noise is generated through the single speaker 7 mounted in the vehicle cabin. Alternatively, for example, multiple speakers are provided (e.g., one speaker on a right side and the other speaker on a left side of the driver) such that the white noise is generated alternately from the right and left speakers. In the above alternative configuration, if the driver is awake, the driver can react to a change of the position of the generation source that generates the white noise.

(Second Modification)

In the above embodiment, the white noise is superimposed on the environment sound around the driver. However, alternatively, the frequency characteristic of the environment sound may be analyzed based on the environment sound taken through the microphone 1. Then, a white noise, which has an opposite phase relative to the analyzed frequency characteristic, may be alternatively generated by the sound generation device 6 to output through the speaker 7. The above process generates a change, in which the sound pressure level of the environment sound is reduced.

As described above, when the driver is awake, the driver can acutely react to the change (change rate) of the stimulation given by the surroundings. As a result, the reaction of the driver can be detected even when the sound pressure level of the environment sound, which the driver receives from the surroundings, is reduced as above.

(Third Modification)

Alternatively, the sound generation device 6 of the above embodiment may take the environment sound through the microphone 1, and analyzes the frequency characteristic of the environment sound in order that the white noise, which is superimposed on the frequency characteristic, may be generated. However, the drivers are different from each other, and therefore, a way (e.g., tendency, preference) of hearing differs among individuals. Therefore, it may be designed such that the frequency characteristic of the pre-warning generated by the sound generation device 6 can be adjusted as necessary. Furthermore, identifying means for identifying a driver may be provided. In this case, a sound pressure level sensed by each driver is calibrated in advance to be stored, and then, the sound pressure level for the pre-warning may be customized for each driver depending on the identification result by the identifying means.

(Fourth Modification)

In the above embodiment, the microphone 1 for taking the environment sound is provided only in the vehicle cabin. However, another microphone may be additionally provided outside the vehicle cabin to take the environment sounds inside and outside the vehicle cabin. Further, the frequency characteristic of the environment sound each of inside and outside the vehicle cabin is analyzed such that a white noise, which has frequency characteristic within a range between the frequency characteristic inside the vehicle and the frequency characteristic outside the vehicle, may be generated as the pre-warning. Due to this, the annoyance of the pre-warning can be also reduced.

(Fifth Modification)

The white noise of the above embodiment may be alternatively superimposed on the environment sound without regarding the sound pressure level and the frequency characteristic of the environment sound. However, a certain white noise may be superimposed on the environment sound. Generally, in practice, "intensity of sound (loudness)" of a continuous spectrum for a target environment sound is not easily measured often. Thus, an A-weighted sound pressure level, which substantially corresponds to the intensity of the environment sound, and which can be easily measured, is corrected in a frequency weighting manner. Then, the frequency weighting sound pressure level may be amplified to generate the white noise. Here, the A-weighted sound pressure level is made by weighting a sound pressure level based on a consideration of the difference in an auditory activity of different person depending on the frequency such that the weighted sound pressure level corresponds directly to a magnitude (intensity) of the sound that is perceived by the person.

(Sixth Modification)

For example, a present position of the vehicle (present position of the driver) may be taken by using a GPS (Global Positioning System). Then, an attribute of a region that corresponds to the present position may be specified based on map data. Then, an environment sound that corresponds to (i.e., that matches with) the attribute of the region may be selected among from acoustic data sets prestored in a memory so that the environment sound may be reproduced (generated) as the pre-warning. Here, the attribute may include a coastal area, an urban area, a mountainous area, a residential area, and a main road.

In this way, the corresponding environment sound that corresponds to the attribute of the region, in which the vehicle exists, can be generated as the pre-warning for taking the reaction of the driver. As a result, the pre-warning generated before the main warning can be generated without annoying the driver. Here, the environment sound in accordance with the attribute of the region may include, for example, (a) a sound of a water wave if the present position is around a beach, or (b) a drive sound of the vehicle or an announce sound from a traffic signal if the present position is in the urban area. Typically, the above traffic signal is a special traffic signal for the visually handicapped that outputs the announce sound through an externally connected speaker in order to inform the visually handicapped of that a pedestrian signal of the traffic signal is green, for example.

(Seventh Modification)

Also, in the above embodiment, the pre-warning or the main warning is generated through the speaker 7 to stimulate an auditory sense (hearing) of the driver. However, stimulation generated by the pre-warning and stimulation generated by the main warning may be received (sensed) by corresponding different sense organ of the driver. In other words, the driver may receive the stimulation by the pre-warning through a first sense organ of the driver. Also, the driver may receive the stimulation by the main warning through a second sense organ of the driver, which is different from the first sense organ.

In other words, it is known that each of sense organs of a person reacts exclusively to a corresponding physical/chemical stimulation, such as light for a visual sense, a sound wave for an auditory sense, flavor for an olfactory sense. The above stimulation is named as adequate stimulation (adequate stimulus), in general. By the above configuration, different sense organs of the person can be correspondingly stimulated.

Specifically, an illumination lamp of a meter of the vehicle may be turned on and off as the pre-warning for stimulating the visual sense. Alternatively, the color of the lamp may be changed, or an intensity of the lamp illumination may be changed. Also, a warning lamp may be flashed in the meter as the main warning for stimulating the visual sense.

Also, air that blows from an air conditioning apparatus may be turned ON/OFF, or the air may blow at a minimum flow rate as the pre-warning for stimulating a tactile sense. The air may blow at a maximum flow rate as the main warning for stimulating the tactile sense. Also, citrus flavor may be generated as the pre-warning for stimulating the olfactory sense, and mint flavor may be generated as the main warning for stimulating the olfactory sense. The above pre-warning and main warning may be alternatively combined such that the stimulation can be given to different sense organs of the person.

(Eighth Modification)

The sleep warning apparatus 100 of the above embodiment gives the warning to the driver of the vehicle. However, a portable telephone (cellular phone) or a personal computer may be alternatively provided with the similar configuration as above such that the present invention can be used in a business scene. In the present case, the sleepiness level of the person (driver) can be estimated using the biosignal, such as a heart rate, a pulse.

The near-infrared LED 3 of the above embodiments is not limited to the LED but can be replaced by any illumination device that emits near infrared light.

Additional advantages and modifications will readily occur to those skilled in the art. The invention in its broader terms is therefore not limited to the specific details, representative apparatus, and illustrative examples shown and described.

What is claimed is:

1. A sleep warning apparatus comprising:
   stimulation generating means for generating stimulation to a person before a warning is given to the person, the stimulation being used to take reaction of the person;
   reaction detecting means for detecting the reaction of the person to the stimulation when the stimulation generated by the stimulation generating means is given to the person;
   warning determining means for determining whether or not the warning is required to be given to the person depending on whether or not the reaction detecting means detects the reaction of the person to the stimulation; and
   warning generating means for giving the warning to the person when the warning determining means determines that the warning is required to be given to the person, wherein the reaction detecting means detects at least one of behavior of the person and a biosignal as the reaction of the person to the stimulation; and
   when the reaction detecting means detects the reaction of the person to the stimulation, the stimulation generating means automatically without manual intervention is stopped from generating the stimulation.

2. The sleep warning apparatus according to claim 1, wherein the stimulation generating means generates the stimulation, to which the person is able to react while the person is awake.

3. The sleep warning apparatus according to claim 1, wherein:
   the person receives the stimulation generated by the stimulation generating means through a first sense organ of the person; and
   the person receives the warning generated by the warning generating means through a second sense organ of the person.

4. The sleep warning apparatus according to claim 1, wherein:
   the stimulation generating means generates the stimulation to the person through a generation source that changes a position as time elapses.

5. The sleep warning apparatus according to claim 1, further comprising:
   surrounding stimulation obtaining means for obtaining surrounding stimulation that the person receives from a surrounding environment, wherein:
   the stimulation generating means increases or decreases an intensity of the stimulation to the person based on the surrounding stimulation taken by the surrounding stimulation taking means.

6. The sleep warning apparatus according to claim 5, wherein the stimulation generating means intermittently increases or decreases the intensity of the stimulation to the person.

7. The sleep warning apparatus according to claim 5, wherein:
the stimulation generating means gradually increases or decreases the intensity of the stimulation to the person as time elapses.

8. The sleep warning apparatus according to claim 1, wherein:
the stimulation generating means generates a white noise as the stimulation to the person.

9. The sleep warning apparatus according to claim 1, further comprising:
sleepiness level determining means for determining a sleepiness level of the person, which level changes with an intensity of sleepiness of the person, wherein:
the stimulation generating means generates the stimulation at a time when the sleepiness level determined by the sleepiness level determining means exceeds a predetermined warning threshold value.

10. The sleep warning apparatus according to claim 1, wherein:
the reaction detecting means detects a certain movement of a sight line of the driver as the reaction of the person to the stimulation.

11. The sleep warning apparatus according to claim 1, wherein:
the reaction detecting means detects the reaction of the person to the stimulation in accordance with an appearance of the person.

12. The sleep warning apparatus according to claim 1, wherein:
the reaction detecting means detects the reaction of the person to the stimulation in accordance with an image of a predetermined facial expression of the person.

13. The sleep warning apparatus according to claim 1, wherein:
the reaction of the person detected by the reaction detecting means is a predetermined involuntary reaction of the person to the stimulation.

* * * * *